United States Patent
Mullati et al.

(10) Patent No.: US 11,438,944 B2
(45) Date of Patent: ***Sep. 6, 2022

(54) DEDICATED TDLS LINK IN OFF-CHANNEL 5 GHZ BAND USING RSDB

(71) Applicant: Cypress Semiconductor Corporation, San Jose, CA (US)

(72) Inventors: Siva Mullati, Munekolala (IN); Nitin Bhaskar, Udupi (IN)

(73) Assignee: Cypress Semiconductor Corporation, San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/924,970

(22) Filed: Jul. 9, 2020

(65) Prior Publication Data

US 2021/0185746 A1 Jun. 17, 2021

Related U.S. Application Data

(63) Continuation of application No. 16/710,328, filed on Dec. 11, 2019, now Pat. No. 10,743,358.

(51) Int. Cl.
*H04W 4/00* (2018.01)
*H04W 76/14* (2018.01)
(Continued)

(52) U.S. Cl.
CPC ........... *H04W 76/14* (2018.02); *H04W 76/12* (2018.02); *H04W 76/15* (2018.02); *H04W 80/02* (2013.01); *H04W 88/06* (2013.01); *H04W 84/12* (2013.01)

(58) Field of Classification Search
CPC ..... H04W 76/14; H04W 76/12; H04W 76/15; H04W 80/02; H04W 88/06; H04W 84/12;
(Continued)

(56) References Cited

U.S. PATENT DOCUMENTS 8,274,903 B2 9/2012 Wentink et al.
8,644,281 B2 2/2014 Seok et al.
(Continued)

FOREIGN PATENT DOCUMENTS

WO 2019117535 A1 6/2019

OTHER PUBLICATIONS

Camps-Mur, Daniel, "Device to Device Communications with WiFi Direct: Overview and Experimentation," University ol Madrid Department of Telematic Engineering, Jul. 2013, pp. 1-8; 8 pages.
(Continued)

*Primary Examiner* — Stephen M D Agosta

(57) ABSTRACT

Devices, systems and methods establish a first wireless link with an access point (AP) via a first frequency band, establish a tunneled direct link setup (TDLS) link with a peer wireless device using the first frequency band. Embodiments, switch from using the first frequency band for the TDLS link to using a second frequency band for the TDLS link and use a real-time simultaneous dual band (RSDB) configuration to communicate with the peer wireless device through the TDLS link using the second frequency band and concurrently communicate with the AP through the first wireless link using the first frequency band.

17 Claims, 6 Drawing Sheets

(51) Int. Cl.
*H04W 76/12* (2018.01)
*H04W 88/06* (2009.01)
*H04W 80/02* (2009.01)
*H04W 76/15* (2018.01)
*H04W 84/12* (2009.01)

(58) Field of Classification Search
CPC ..... H04W 76/27; H04B 7/0617; H04B 1/005; H04B 1/0053; H04B 1/0057; H04B 1/1018; H04L 45/245; H04L 12/4641; H04L 1/0041; H04L 1/006; H04M 1/72409; H04M 1/72412; H04M 2250/02; H04J 3/1694
See application file for complete search history.

(56) References Cited

U.S. PATENT DOCUMENTS

| | | | |
|---|---|---|---|
| 9,271,322 | B2 | 2/2016 | Vaidya et al. |
| 9,288,139 | B2 | 3/2016 | Zhou et al. |
| 9,538,368 | B2 | 1/2017 | Seok et al. |
| 9,560,689 | B2 * | 1/2017 | Aoki .............. H04W 76/14 |
| 9,948,993 | B2 | 4/2018 | Amano et al. |
| 9,992,775 | B2 * | 6/2018 | Katar .............. H04W 76/10 |
| 10,051,558 | B2 | 8/2018 | Phogat et al. |
| 10,270,515 | B2 | 4/2019 | Lee et al. |
| 10,321,484 | B2 | 6/2019 | Lou et al. |
| 10,425,888 | B2 * | 9/2019 | Nishida .............. H04W 24/02 |
| 2007/0032230 | A1 | 2/2007 | Pregont |
| 2007/0253466 | A1 | 11/2007 | Jones et al. |
| 2009/0022125 | A1 * | 1/2009 | Seok .............. H04W 76/34 |
| | | | 370/338 |
| 2010/0278084 | A1 | 11/2010 | Jones et al. |
| 2011/0034127 | A1 | 2/2011 | Wentink et al. |
| 2013/0272262 | A1 * | 10/2013 | Li .............. H04L 5/0023 |
| | | | 370/330 |
| 2014/0035527 | A1 | 2/2014 | Hayashigawa et al. |
| 2014/0099950 | A1 | 4/2014 | Mildh et al. |
| 2014/0128063 | A1 | 5/2014 | Chhabra |
| 2014/0199969 | A1 | 7/2014 | Johnsson et al. |
| 2014/0355527 | A1 | 12/2014 | Vaidya et al. |
| 2014/0376392 | A1 | 12/2014 | Hegde et al. |
| 2015/0126188 | A1 * | 5/2015 | Lindoff .............. H04W 76/14 |
| | | | 455/434 |
| 2015/0207474 | A1 | 7/2015 | Seong |
| 2015/0289307 | A1 | 10/2015 | Li et al. |
| 2015/0350854 | A1 | 12/2015 | Pollack et al. |
| 2016/0037340 | A1 | 2/2016 | Rayment et al. |
| 2016/0119797 | A1 | 4/2016 | Das et al. |
| 2016/0233902 | A1 | 8/2016 | Choudhary et al. |
| 2016/0261430 | A1 | 9/2016 | Lepp et al. |
| 2016/0353301 | A1 * | 12/2016 | Kim .............. H04W 48/16 |
| 2017/0150493 | A1 * | 5/2017 | Seok .............. H04B 7/0452 |
| 2017/0295104 | A1 | 10/2017 | Hampel et al. |
| 2017/0325158 | A1 * | 11/2017 | Phogat .............. H04L 61/6022 |
| 2018/0014146 | A1 * | 1/2018 | Gulati .............. H04W 76/10 |
| 2018/0048701 | A1 | 2/2018 | Iwami et al. |
| 2018/0145919 | A1 * | 5/2018 | Kalikot Veetil ...... H04L 45/245 |
| 2018/0183468 | A1 | 6/2018 | Emmanuel et al. |
| 2019/0014469 | A1 | 1/2019 | Dees et al. |
| 2019/0075608 | A1 | 3/2019 | Xing et al. |
| 2019/0273573 | A1 | 9/2019 | Hosseini et al. |
| 2020/0358634 | A1 * | 11/2020 | Lee .............. H04L 67/14 |

OTHER PUBLICATIONS

International Search Report for International application No. PCT/US2020/040528 dated Aug. 31, 2020, 2 pages.
USPTO Non-Final Rejection for U.S. Appl. No. 16/710,328 dated Feb. 3, 2020, 16 pages.
USPTO Notice of Allowance for U.S. Appl. No. 16/710,328 dated Apr. 7, 2020, 9 pages.
Written Opinion of the International Searching Authority for International application No. PCT/US2020/040528 dated Aug. 31, 2020, 6 pages.

* cited by examiner ature, DEDICATED TDLS LINK IN OFF-CHANNEL 5 GHZ BAND USING RSDB

CROSS-REFERENCE TO RELATED APPLICATIONS

This application is a continuation of U.S. Non-Provisional patent application Ser. No. 16/710,328, filed on Dec. 11, 2019, which is hereby incorporated by reference herein in its entirety.

TECHNICAL FIELD

The subject technology generally relates to wireless communication systems, and more particularly, to methods and systems for a wireless device to perform real time simultaneous communication with multiples devices using two different frequency bands or channels of a wireless communication medium.

BACKGROUND

WLAN systems complying with the IEEE 802.11 (WiFi™) standard are used by a wide array of devices for multimedia and gaming applications. The WiFi standard and a host of other standards such as Bluetooth™ use channels in the 2.4 GHz industrial, scientific and medical (ISM) frequency band. Even when a device is dual-band capable, such as a mobile device that is capable of working in both the 2.4 GHz and 5 GHz bands, the device may choose to operate in the crowded 2.4 GHz band over the 5 GHz band based on higher received signal strength indicator (RSSI) or easier discoverability due to better signal propagation characteristics of 2.4 GHz signals compared to 5 GHz signals when the device associates with a dual-band access point (AP). To reduce the congestion in the 2.4 GHz band, an amendment of the IEEE 802.11z standard provides the facility for mobile devices, also referred to as stations or STAs, that are dual-band capable and connected to a traditional WiFi network in the 2.4 GHz band, to establish a direct link with other peer STAs in the 5 GHz band using tunneled direct link setup (TDLS). The dual-band capable STA may communicate with its associated AP over the 2.4 GHz band, also referred to as the base-channel, while using the 5 GHz band, also referred as the off-channel, for TDLS direct links with one or more peer STAs. Conventionally, the STA working in such virtual simultaneous dual band (VSDB) configuration with the TDLS direct links toggles between the off-channel and the base-channel. For example, the STA operating with the TDLS direct link may periodically put the off-channel in the power saving mode and may switch from the off-channel to the base-channel to receive beacons and communicate with legacy STAs via the AP over the base-channel. After operating in the base-channel, the STA may put the base-channel in the power saving mode and may switch back to the off-channel to transfer data over the TDLS direct links with other peer STAs. However, switching between the off-channel and base channel introduces latency in the TDLS direct links, making the VSDB configuration with TDLS direct links less than ideal for supporting gaming and multimedia applications that require low latency and seamless data transfer.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
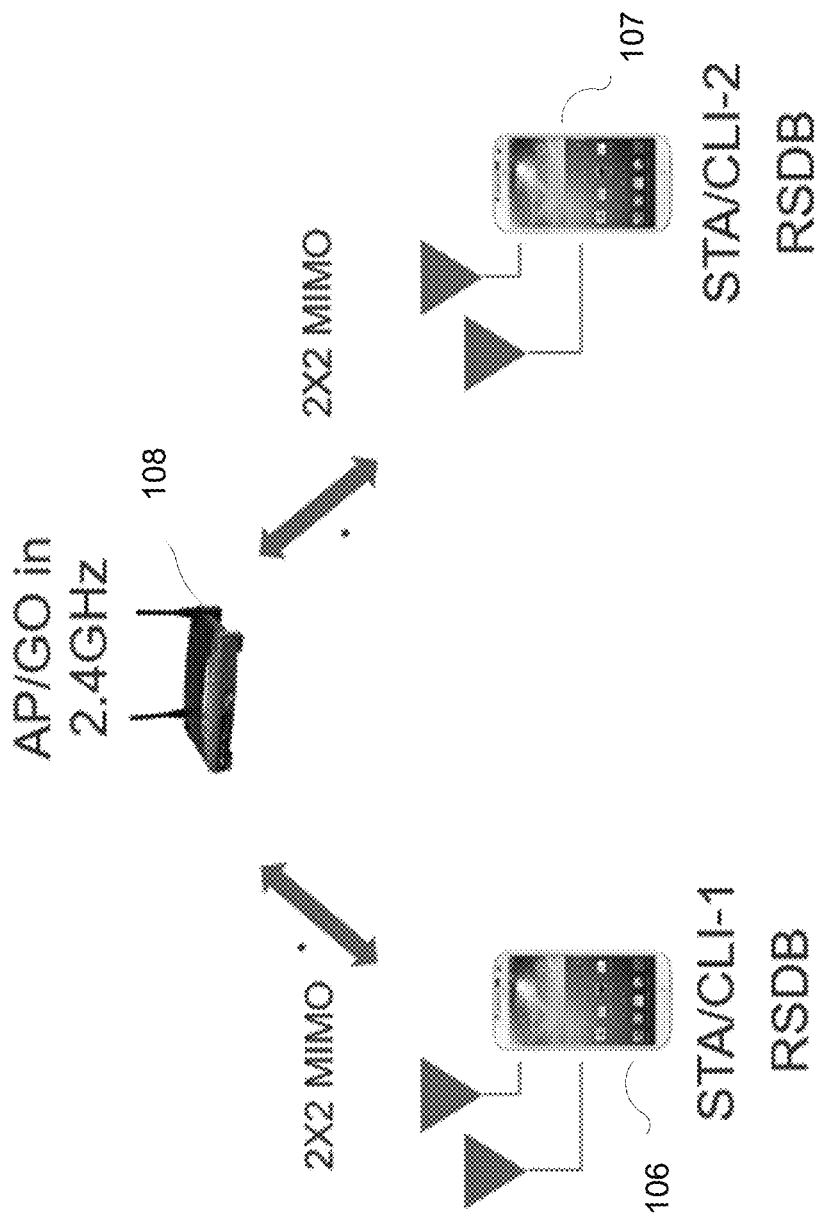
FIG. 1 illustrates an example of a WLAN system in which two wireless devices (STAs) communicate with an access point (AP) of a WiFi network over the base-channel, in accordance with one embodiment of the present disclosure.

Examples of various aspects and variations of the subject technology are described herein and illustrated in the accompanying drawings. The following description is not intended to limit the invention to these embodiments, but rather to enable a person skilled in the art to make and use this invention. For example, while examples, implementations, and embodiments of the subject technology are described using wireless devices operating in a WLAN system that complies with various versions of the IEEE 802.11 (WiFi™) standard, the subject technology is not thus limited and may be applicable to other types of communication devices operating in other types of WLAN systems or in a wide area network.

To make full use of TDLS direct links with peer STAs in a dual-band capable STA of a WiFi system, it is desirable for the STA to operate in a real-time simultaneous dual band (RSDB) configuration in which the base-channel link to the WiFi network through the AP and the off-channel links to the peer STAs through the TDLS may operate in parallel. For example, the STA may operate the base-channel link over the 2.4 GHz band to receive beacons from the AP and to communicate with legacy STAs in parallel with operating the off-channel TDLS direct links over the 5 GHz band to communicate with peer STAs. In contrast to a virtual simultaneous dual band (VSDB) configuration, the STA does not need to toggle between the base-channel and the off-channel to operate both links. That is, in the RSDB configuration the STA does not need to put the base-channel link in the power saving mode to communicate with the peer STAs over the TDLS links using the off-channel. Similarly, the STA does not need to put the off-channel TDLS links in the power saving mode to communicate with legacy STAs via the AP over the base-channel.

Advantageously, by avoiding switching between the base-channel and the off-channel, the RSDB configuration enables low latency data transfer over the direct TDLS links. Discontinuity of data transfer over the direct TDLS links may also be eliminated. When there are multiple TDLS links to multiple peer STAs, the improvement in data throughput is further enhanced due to the elimination of more switching opportunities. The TDLS links for peer-to-peer communication in the RSDB configuration may thus support the requirements for low latency and seamless data transfer of gaming and multimedia applications. In addition, the base-channel is always available for data transfer with legacy STAs in the WiFi network, improving latency and data throughput with the legacy STAs as well.

A STA that supports RSDB may have a dual-band radio transceiver that contains two media access controllers (MACs) and two physical layer cores (PHYs). A first pair of MAC and PHY may to operate over the 2.4 GHz base-channel with an AP to transfer data with legacy STAs that operate in the 2.4 GHz band. A second pair of MAC and PHY may be configured to operate over the 5 GHz off-channel to transfer data on one of more TDLS direct links with one or more peer STAs. While the off-channel is characterized as the 5 GHz band in various embodiments described, it is understood that the off-channel may include other frequency bands such as 6 GHz, 7 GHz bands or sub-GHz bands. The first pair of MAC and PHY may only support 2.4 GHz operation. The second pair of MAC and PHY may be capable of supporting both the 2.4 GHz band and the 5 GHz band but is configured for the 5 GHz operation for the TDLS direct links. Each respective pair of MAC and PHY may transmit and receive over one or more antennas. By having two pairs of MAC and PHY that operate independently over the 2.4 GHz and the 5 GHz bands, the STA may maintain the base-channel link and the off-channel TDLS links in parallel for RSDB operation.

To perform RSDB operation, the STA may initially discover and associate with an AP over the 2.4 GHz band to establish a link with the AP over the base-channel. The AP with the associated STA and other STA similarly linked and managed by the AP may constitute a basic service set (BSS) of the WiFi network. The STA may use the pair of MAC and PHY that operates only over the 2.4 GHz band, which may be referred to as transceiver-1, to establish the link with the AP. The other pair of MAC and PHY, which may be configured to operate over the 5 GHz band and may be referred to as transceiver-0, may be in the power saving mode initially. In one embodiment, to achieve better antenna gain or for antenna diversity, the STA may configure transceiver-1 to transmit and receive over the antenna of transceiver-1 and the antenna of transceiver-0 in a multiple-in-multiple-out (MIMO) configuration. To setup a TDLS link with peer STAs that are also associated with the AP, the STA and the peer STAs may exchange their device capabilities. For example, the STA may transmit a TDLS setup request frame via the AP to advertise its off-channel capability and to inquire about the off-channel capabilities of peer STAs. If a peer STA is dual-band capable, the peer STA may respond with a TDLS response frame indicating that it supports off-channel capability. The TDLS response frame may also contain a TDLS channel switching capability field that indicates that the peer STA is capable of RSDB operation using the off-channel TDLS link.

The STA may initially establish a TDLS link with the peer STA over the base channel if the peer STA supports off-channel operation. Upon the successful establishment of the TDLS link and if the peer STA's TDLS channel switching capability field is set, the STA may initiate a channel switch request for the 5 GHz off-channel. For example, the STA may transmit a TDLS channel switch request frame over the TDLS direct link in the base channel to the peer STA. The peer STA may respond with a TDLS channel switch response frame over the TDLS direct link in the base channel to the STA. Upon the successful channel switch negotiation, the STA and the peer STA may switch their TDLS direct link from the base-channel to the 5 GHz off-channel. The STA may then listen for transmission from the peer STA or transmit to the peer STA over the off-channel TDLS direct link. For example, the STA may configure the MAC and PHY of transceiver-0 for the TDLS direct link with the peer STA. Tranceiver-0 may transmit and receive over the 5 GHz band using its antenna in a single-in-single-out (SISO) configuration. The STA may continue to operate transceiver-1 for the link with the AP to receive beacons from the AP and to connect to legacy STAs that operate in the 2.4 GHz band. Transceiver-1 may transmit and receive over the 2.4 GHz band using its antenna in a SISO configuration.

Thus, in the RSDB configuration, the STA operates the base-channel link and the off-channel link simultaneously. The STA does not need to switch between the base-channel and the off-channel when the STA transfers data with the legacy STAs over the base-channel and with the peer STAs over the off-channel. Both links may be fully maintained without incurring the performance penalties of increased latency and reduced throughput when the STA has to put one link to the power saving mode when serving the other link. In one embodiment, the STA may establish multiple TDLS direct links over the 5 GHz off-channel with multiple peer STAs. If the STA initiates the establishment of the TDLS direct links with the peer STAs, the STA is referred to as the initiator. As the initiator, the STA maintains a list of peer STAs, also referred as the responders, with which it has established TDLS direct links. The initiator may arbitrate requests from the responders for access to the TDLS direct links. In one embodiment, if the peer STA has moved such that peer-to-peer data transfer over the TDLS direct link over the off-channel is not feasible, the STA may negotiate with the peer STA to switch the TDLS direct link from the off-channel to the base-channel via the AP.

In one aspect of the technology, when the STA wants to disable or teardown the TDLS link, the STA may send a teardown frame to the peer STAs. The STA may disable the TDLS links with one or more peer STAs or with all the peer STAs. If the STA is the initiator, the STA may transmit a teardown frame to a responder through the TDLS direct link over the off-channel. If the responder has moved such that it is no longer reachable via the TDLS direct link, the initiator may send the teardown frame via the AP over the base-channel. The responder may respond with an acknowledgement frame to the teardown frame. The initiator may teardown the TDLS link with the responder and may clear the entry for the responder from the list of peer STAs.

Similarly, if the responder wants to disable the TDLS link with the initiator, the responder may transmit a teardown frame to the initiator through the TDLS direct link over the off-channel or via the AP over the base-channel. Upon receiving the teardown frame from the responder, the initiator may teardown the TDLS link with the responder and may clear the entry for the responder from the list of peer STAs.

In one embodiment, if the STA as the initiator wants to disassociate from the AP, the STA may teardown the TDLS links with all its peer STAs before tearing down the link to the AP over the base-channel. The STA may transmit the teardown frames to all its responders through the TDLS direct links over the off-channel or via the AP over the base-channel in the manner described. After tearing down all the TDLS links and clearing all the entries for the responders from the list of peer STAs, the STA may teardown the link to the AP. In one embodiment, the AP may want to disassociate from BSS that includes the STA and the peer STAs. The AP may transmit a disassociation frame to the STA over the base-channel link. After receiving the disassociation frame, the STA may teardown the TDLS links with all its peer STAs in the manner described.

In one embodiment, a wireless device of a STA of a wireless network is disclosed. The wireless device includes a dual-band radio that provides a first wireless link on a first frequency band to an AP of the wireless network and a TDLS link on a second frequency band to communicate with a peer STA of the wireless network. The first wireless link and the TDLS link may operate in parallel using the RSDB configuration to allow the STA to communicate in parallel with the AP on the first frequency band and with the peer STA through the TDLS link on the second frequency band. The wireless device may be a WLAN device that conforms to any version of the IEEE 802.11 (WiFi™) standard.

In one embodiment, a method for establishing a connection between a dual-band STA with an AP over the base-channel for communicating with the AP and legacy STAs and for establishing a TDLS direct link between the STA with a peer STA over the off-channel in the RSDB configuration is disclosed. The method includes establishing by the dual-band STA a first wireless link on a first frequency band (e.g., 2.4 GHz base-channel) to the AP of a wireless network. The method also includes establishing between the STA and the peer STA a TDLS link on the first frequency band and determining whether the peer STA supports RSDB configuration on a second frequency band (e.g. 5 GHz off-channel). If the peer STA supports RSDB configuration on the second frequency band, the method further includes switching the TDLS link from the first frequency band to the second frequency band. The method further includes the STA communicating with the peer STA through the TDLS link on the second frequency band in parallel with communicating with the AP over the first frequency band using the RSDB configuration.

FIG. 1 illustrates an example of a WLAN system in which two wireless devices (STAs) communicate with an access point (AP) or group owner (GO) of a WiFi network over the base-channel, in accordance with one embodiment of the present disclosure. The WLAN system may be any version of the IEEE 802.11 (WiFi™) standard, including 802.11z that provides the facility for dual-band capable STAs to establish TDLS direct links with peer STAs in the 5 GHz band. Wireless devices 106 and 107 are user equipment, also referred to as user station (STAs), that are configured to associate with an AP 108. In one embodiment, STAs 106 and 107 may be multimedia devices used in automotive environments, such as media sharing or multi-user gaming consoles in an automobile, or portable communication devices such as smartphones that operates over a local or a wide area network. The STAs 106, 107 and the AP 108 may form a basic service set (BSS).

AP 108 may be configured to operate over channels of the 2.4 GHz band. In one embodiment, AP 108 may be capable of operating over both the 2.4 GHz and 5 GHz bands. STAs 106 and 107 are dual-band capable STAs that support RSDB. For example, the hardware of STAs 106 and 107 may have two pairs of MACs and PHYs and two antennas that may be configured to operate simultaneously over the 2.4 GHz and the 5 GHz bands. The software or firmware of STAs 106 and 107 may support TDLS. STAs 106 and 107 may discover and associate with the AP 108 over the 2.4 GHz base channel to establish a link with the AP. Once associated with the AP 108, the STAs 106 or 107 may receive beacons or commands from the AP 108 and may transmit data to the AP 108, with each other, or to devices of a wide area network such as the Internet via AP 108. The transmission from AP 108 to STAs 106 or 107 may be referred to as a downlink (DL) transmission. The transmission from STAs 106 or 107 to AP 108 may be referred to as an uplink (UL) transmission. To achieve better antenna gain or for antenna diversity, STAs 106 and 107 may be configured to transmit and receive data over their respective dual antennas in a 2×2 MIMO configuration. Initially, communication between STAs 106 and 107 are established via the STAs' respective base-channel links with the AP. This may consume bandwidth over the crowded 2.4 GHz band. To reduce congestion, STAs 106 and 107 may establish TDLS links between them over the 5 GHz off-channel.

To setup the TDLS links, STAs 106 and 107 may exchange their device capabilities. For example, STA 106 may transmit a TDLS setup request frame via AP 108 over the base-channel to advertise its off-channel capability to STA 107 and to inquire about the off-channel capabilities of STA 107. If STA 107 is dual-band capable, STA 107 may respond with a TDLS response frame back to STA 106 indicating that it supports TDLS off-channel capability. The TDLS response frame may also contain a TDLS channel switching capability field that indicates that STA 107 is capable of RSDB operation using the off-channel TDLS link.

Figure 2:
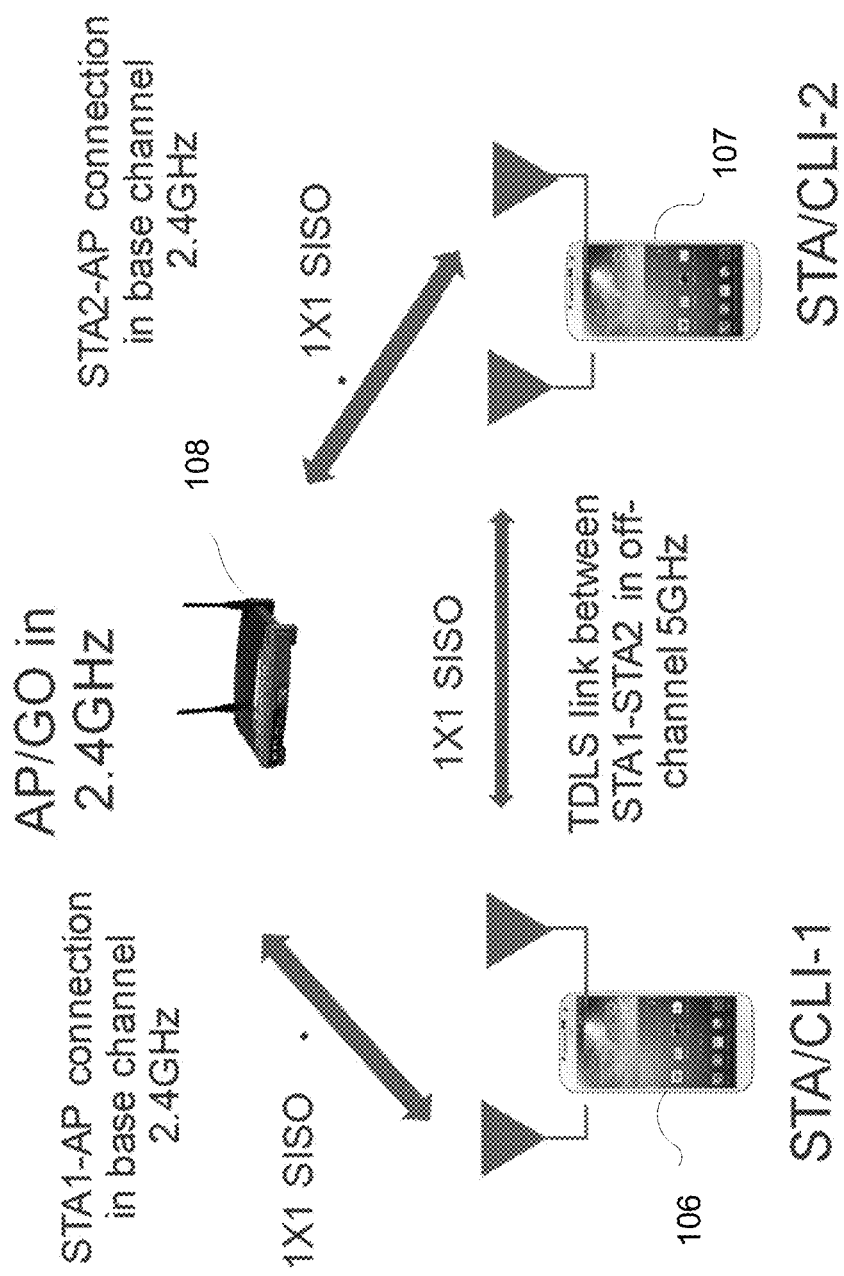
FIG. 2 illustrates an example of two STAs communicating with the AP over the base-channel and communicating with one another via a TDLS direct link over the off-channel using a real time simultaneous dual band (RSDB) configuration in accordance with one embodiment of the present disclosure.

FIG. 2 illustrates an example of STAs 106 and 107 communicating with AP 108 over the base-channel and communicating with one another via a TDLS direct link over the off-channel using a RSDB configuration in accordance with one embodiment of the present disclosure. Both STAs 106 and 107 support RSDB and TDLS over the 5 GHz off-channel as indicated by the TDLS channel switching capability field during the exchange of their device capabilities. STAs 106 and 107 may initially establish a TDLS link with each other over the base channel. Upon the successful establishment of the TDLS link, STAs 106 and 107 may initiate channel switch request for the 5 GHz off-channel.

STA 106 may transmit a TDLS channel switch request frame over the TDLS link over the base channel to STA 107. Peer STA 107 may respond with a TDLS channel switch response frame over the TDLS link in the base channel to STA 106. Upon successful channel switch negotiation, STAs 106 and 107 may switch their TDLS link from the base channel to the 5 GHz off-channel. STAs 106 and 107 may then listen for transmission from the other STA over the off-channel TDLS direct link. STA 106 and 107 may configure their antennas to transmit and receive over the off-channel 5 GHz band for the TDLS direct link in a SISO configuration. Similarly, STAs 106 and 107 may configure their antennas to transmit and receive over the on-channel 2.4 GHz band for receiving commands and beacons from AP 108 and for communicating with legacy STAs of the BSS in a SISO configuration.

STAs 106 and 107 may simultaneously communicate with each other over their off-channel TDLS direct link and with AP 108 and legacy STAs over the base-channel in the RSDB configuration, reducing packet latency, eliminating discontinuity of data transfer, and increasing data throughput. In one embodiment, if STAs 106 or 107 has moved such that the TDLS direct link over the off-channel cannot be maintained, STAs 106 and 107 may negotiate to switch their TDLS direct link from the off-channel to the base-channel. STAs 106 or 107 may repeat the handshaking to exchange their device capabilities with other 2.4 GHz/5 GHz RSDB-capable and TDLS-supported peer STAs over the base-channel, establish TDLS links with the peer STAs over the base-channel, and negotiate to switch the TDLS links from the base-channel to the off-channel to establish multiple TDLS direct links with multiple peer STAs.

In the described example in which STA 106 initiated the establishment of the TDLS direct link with STA 107 by transmitting a TDLS setup request frame to STA 107, STA 106 is the initiator and STA 107 is the responder. To disable the TDLS direct link, STA 106 as the initiator may transmit a teardown frame to STA 107 over the off-channel TDLS direct link. If STA 107 is not reachable via the off-channel TDLS direct link and the TDLS direct link has been switched from the off-channel to the base-channel, STA 106 may transmit the teardown frame to STA 107 through the TDLS direct link over the base-channel. In one embodiment, if STA 107 is not reachable via the off-channel TDLS direct link, STA 106 may transmit the teardown frame to STA 107 through the AP link over the base-channel. STA 107 may respond with an acknowledgement frame to the teardown frame. After receiving the acknowledgement frame, STA 106 may teardown the TDLS link with STA 107 and may clear the entry for STA 107 from the list of peer STAs maintained by STA 106. In one embodiment, STA 106 may then disassociate from AP 108 by tearing down the base-channel AP link.

STA 107 as the responder may also request that the TDLS direct link with STA 106 be torn down by transmitting a teardown frame to STA 106 over the off-channel TDLS direct link, the TDLS direct link over the on-channel if the TDLS direct link has been switched from the off-channel to the on-channel, or via the AP link over the base-channel. After receiving the teardown frame, STA 106 may teardown the TDLS link with STA 107.

Figure 3:
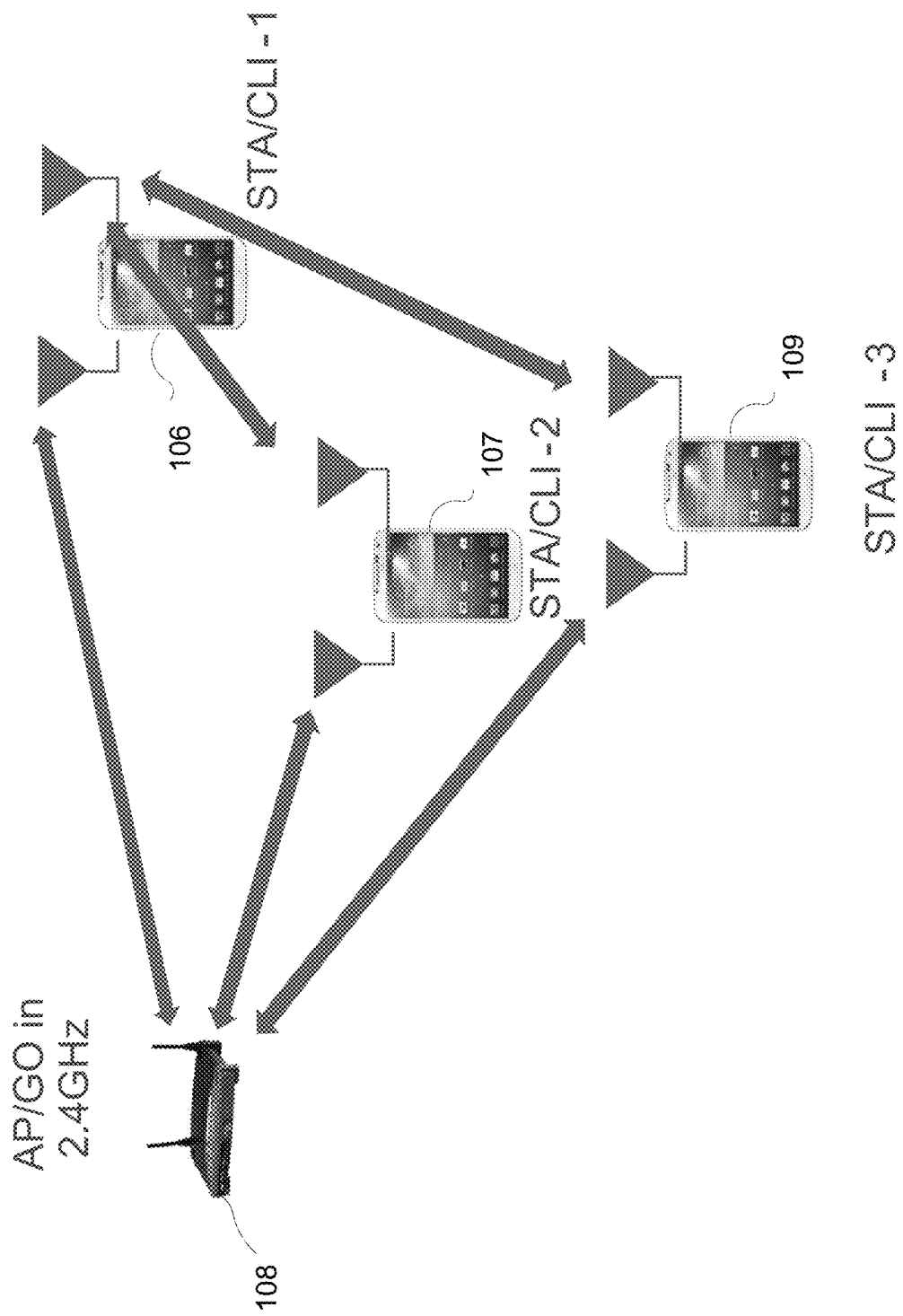
FIG. 3 illustrates an example of three STAs communicating with the AP over the base-channel and one of the STAs communicating with the two other STAs via two TDLS direct links over the off-channel using the RSDB configuration in accordance with one embodiment of the present disclosure.

FIG. 3 illustrates an example of three STAs 106, 107, and 109 communicating with AP 108 over the base-channel and STA 106 communicating with STAs 107 and 109 via two TDLS direct links over the off-channel using the RSDB configuration in accordance with one embodiment of the present disclosure. STAs 106, 107, and 109 may all support RSDB and TDLS over the 5 GHz off-channel. STA 106 as the initiator may establish a TDLS direct link with STA 107 and a TDLS direct link with STA 109 in the manner described in FIG. 2. STA 106 may maintain a list of peer STAs indicating that STAs 107 and 109 have TDLS direct links.

STA 106 may simultaneously communicate with STA 107 or STA 109 over their respective off-channel TDLS direct link and with AP 108 and legacy STAs over the base-channel in the RSDB configuration. STAs 107 or 109 may simultaneously communicate with STA 106 over its respective off-channel TDLS direct link and with AP 108 over the base-channel in the RSDB configuration. STA 106 as the initiator may manage the bandwidth and the medium of the 5 GHz off-channel when communicating with both STA 107 and 109. For example, STA 106 may arbitrate between requests for access to the 5 GHz off-channel to prioritize or allocate channels in the 5 GHz band between TDLS direct links to STAs 107 and 109. In one embodiment, multiplexed access to the communication resources between the two off-channel TDLS direct links may be implemented using time-division multiple access (TDMA), frequency-division multiple access (FDMA), code-division multiple access (CDMA) techniques, or a combination thereof.

Figure 4:
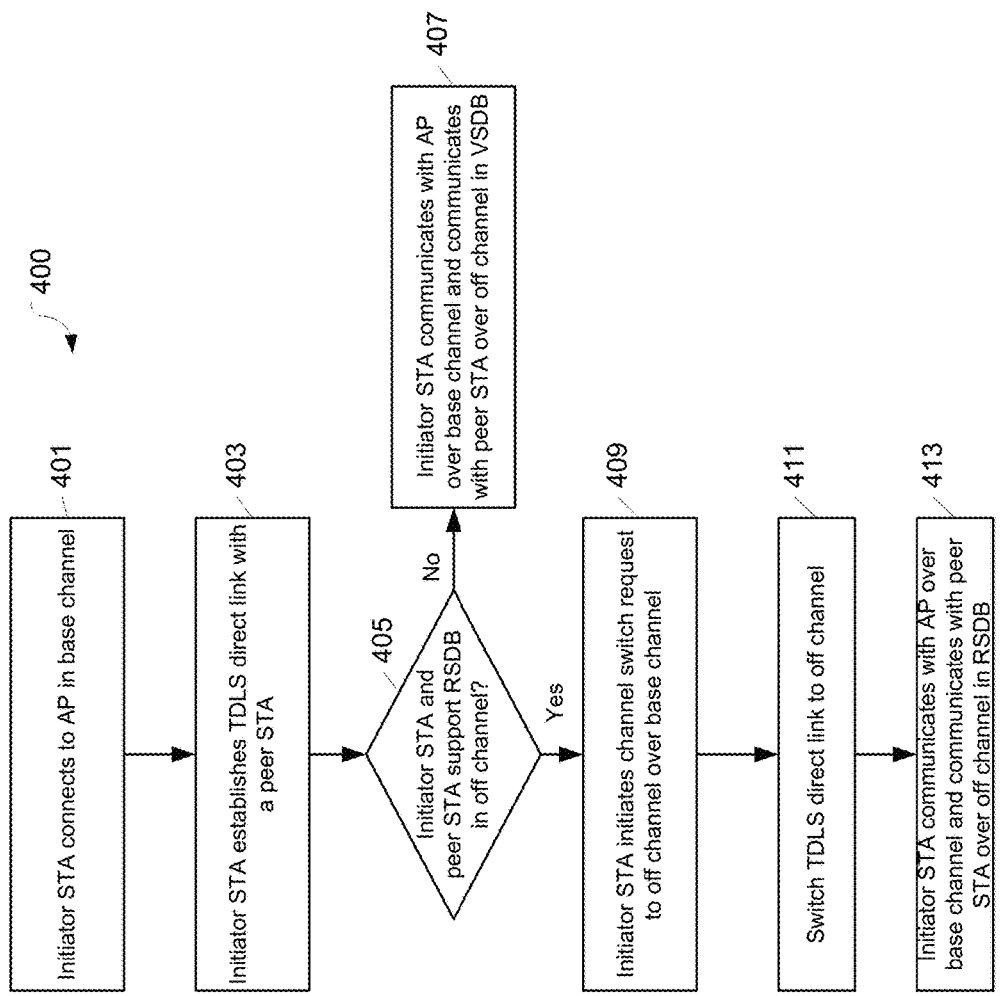
FIG. 4 shows a flow chart of a method for an initiator STA to establish a connection with an AP over the base-channel for communicating with the AP and legacy STAs and to establish a TDLS direct link with a peer STA over the off-channel in the RSDB configuration in accordance with one embodiment of the present disclosure.

FIG. 4 shows a flow chart of a method 400 for an initiator STA to establish a connection with an AP over the base-channel for communicating with the AP and legacy STAs and to establish a TDLS direct link with a peer STA over the off-channel in the RSDB configuration in accordance with one embodiment of the present disclosure. The method of FIG. 4 may be practiced by the STAs 106, 107, or 109 of FIGS. 1, 2 and 3 in a WLAN network that includes the AP 108 in a BSS that complies with the WiFi standard. The initiator STA and the peer STA are dual-band capable STAs that support 2.4 GHz/5 GHz RSDB with TDLS direct link capability.

At operation 401, the initiator STA connects to the AP in the 2.4 GHz base-channels. The initiator STA may discover and associate with the AP over the base-channel to establish a link with the AP. Once associated with the AP, the initiator STA may receive beacons or commands from the AP over the base-channel. The initiator STA may also transfer data with one or more peer STAs of the BSS over the base-channel or to devices of a wide area network via the AP link and a gateway. The peer STAs are also connected to the AP through their respective 2.4 GHz base-channel AP links.

At operation 403, the initiator STA establishes a TDLS link with a peer STA over the base-channel. The initiator STA may transmit a TDLS setup request frame via the AP over the base-channel to advertise its off-channel capability to the peer STAs of the BSS and to inquire about the off-channel capabilities of the peer STAs. If a peer STA is dual-band capable and supports TDLS direct links, the peer STA may respond with a TDLS response frame back to the initiator STA 106 indicating that the peer STA supports TDLS off-channel capability. The initiator STA may then establish a TDLS link with the peer STA initially over the base-channel. The TDLS response frame may also contain a TDLS channel switching capability field that indicates whether the peer STA is capable of RSDB operation using the off-channel TDLS link.

At operation 405, the initiator STA checks the TDLS channel switching capability field of the TDLS response frame from the peer STA to determine if the peer STA supports RSDB operation using the off-channel TDLS link. If the peer STA does not support RSDB operation using the off-channel TDLS link, for example if the peer STA has only one MAC and PHY transceiver that may be configured to operate over either the base-channel or the off-channel, but not both channels simultaneously, the initiator STA and the peer STA may establish their TDLS direct link in the virtual simultaneous dual band (VSDB) configuration at operation 407. In the VSDB configuration, the initiator STA toggles between operating in the off-channel to service the TDLS direct link with the peer STA and operating in the on-channel to receive beacons and communicate with legacy STAs via the AP.

At operation 409, if the peer STA supports RSDB operation using the off-channel TDLS link, for example if the peer STA has two pairs of MAC and PHY that may be configured to operate both the base-channel and the off-channel simultaneously, the initiator STA initiates a channel switch request for the 5 GHz off-channel. The initiator STA may transmit a TDLS channel switch request frame over the TDLS direct link in the base channel to the peer STA. The peer STA may respond with a TDLS channel switch response frame over the TDLS direct link in the base channel to the initiator STA.

At operation 411, upon successful channel switch negotiation, the initiator STA switches the TDLS direct link with the peer STA from the base-channel to the off-channel. The initiator STA may then listen for transmission from the peer STA.

At operation 413, the initiator receives beacons and communicates with the AP and with legacy STAs over the base-channel and communicates with the peer STA over the off-channel in the RSDB configuration. The initiator STA may operate the base-channel and the off-channel simultaneously. Therefore, in contrast to the VSDB configuration, the initiator STA does not switch between the base-channel and the off-channel when the initiator STA transfers data with the legacy STAs over the base-channel and with the peer STA over the off-channel. Both links may be fully maintained without incurring the performance penalties of increased latency and reduced throughput when the initiator STA has to put one link to the power saving mode when serving the other link.

Figure 5:
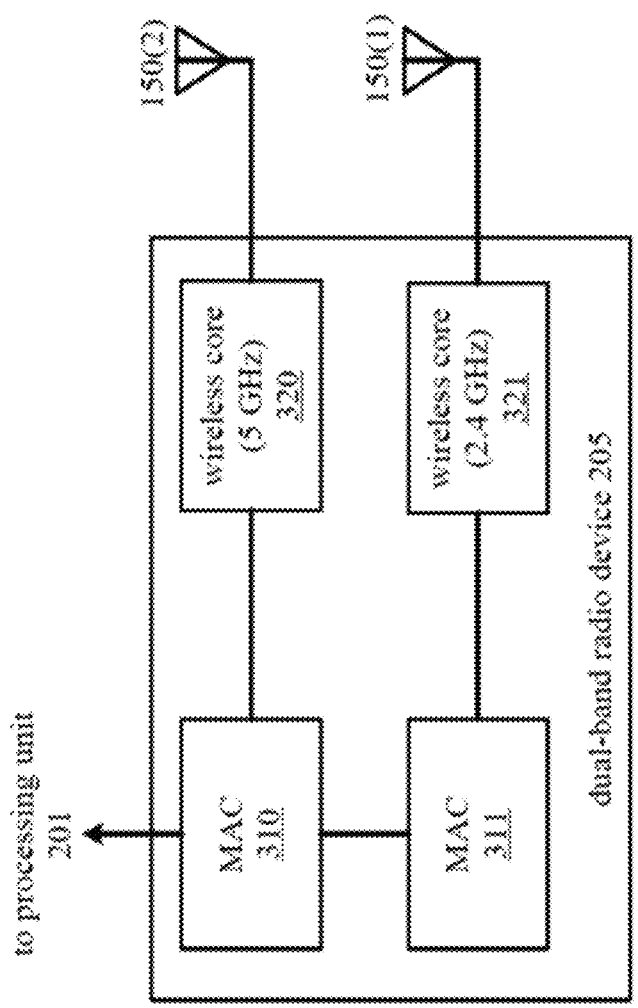
FIG. 5 is a block diagram of a dual-band radio device of a STA that supports RSDB communication over the base-channel with an AP and over the off-channel with peer STAs using TDLS direct links in accordance with one embodiment of the present disclosure.

FIG. 5 is a block diagram of a dual-band radio device of a STA that supports RSDB communication over the base-channel with an AP and over the off-channel with peer STAs using TDLS direct links in accordance with one embodiment of the present disclosure. The dual-band radio device 205 includes a first pair of MAC 311 and PHY wireless core 321 configured to implement a 2.4 GHz base-channel link with the AP to receive beacons and to communicate with the AP, as well as to transfer data with legacy STAs that operate in the 2.4 GHz band via the AP. A second pair of MAC 310 and PHY wireless core 320 is configured to implement one or more 5 GHz off-channel TDLS links to transfer data with one or more peer STAs.

In one embodiment, the first pair of MAC module 311 and PHY wireless core 321 may only support the 2.4 GHz band. The first pair of MAC module 311 and PHY wireless core 321 may be configured to transmit and receive using antenna 150 (1). The second pair of MAC module 310 and PHY wireless core 320 may be capable of supporting both the 2.4 GHz and the 5 GHz bands but is configured for the 5 GHz operation for the TDLS direct links. The second pair of MAC module 310 and PHY wireless core 320 may be configured to transmit and receive using antenna 150 (2). In one embodiment, antennas 150(1) and 150(2) may each be an array of antennas that may be configured as MIMO antennas.

MAC modules 310 and 311 encapsulate data into frames to be transmitted wirelessly, then forward the frames to PHY wireless cores 320 and 321 to be modulated and up-converted into radio frequency (RF) signals in the 5 GHz and 2.4 GHz bands and transmitted via antennas 150(2) and 150(1), respectively. PHY wireless cores 320 and 321 also receive RF signals in the 5 GHz and 2.4 GHz bands from antennas 150(2) and 150(1) to be down-converted and demodulated into frames of received data processed by MAC modules 310 and 311, respectively. In one embodiment, each of the PHY wireless cores 320 and 321 includes radio transceiver circuitry, modulator and demodulator (modem) circuitry, and other physical layer circuit modules for performing the wireless transmission and reception.

In the dual-band radio device 205, MAC module 310 for the 5 GHz band may function as a master or primary "slice," while MAC 311 for the 2.4 GHz band may function as a slave or secondary "slice." MAC module 310 for the master slice is interconnected to a processing unit 201, such as interconnected over AXI to a single ARM core. The processing unit 201 may implement the method of FIG. 4 to establish a link over the 2.4 GHz base-channel for communicating with an AP and to establish a TDLS direct link over the 5 GHz off-channel to communicate with the dual-band radio device of a peer STA in the RSDB configuration. Data provided from the processing unit 201 to the MAC module 311 of the slave slice is passed to the slave slice by the MAC module 310 of the master slice.

Figure 6:
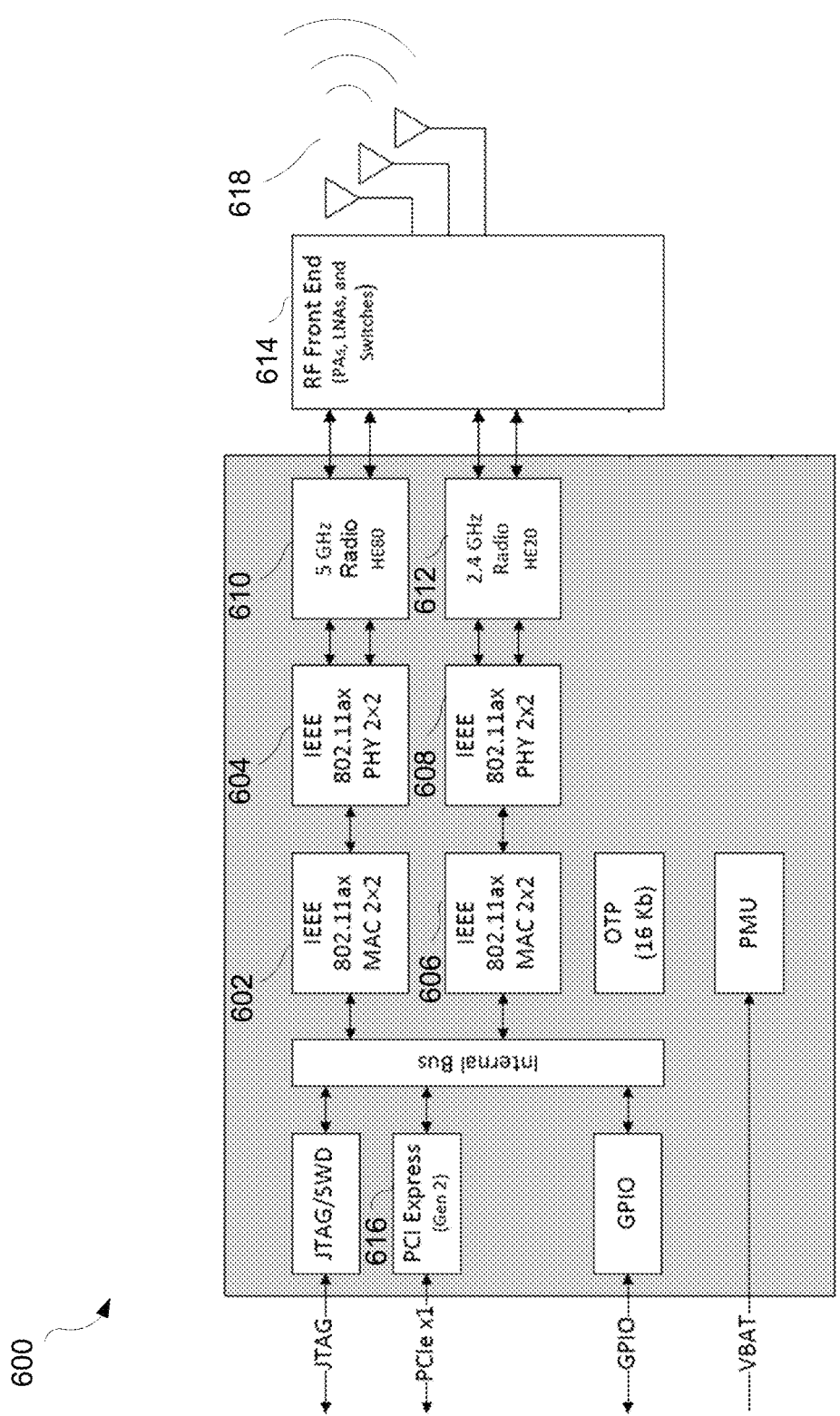
FIG. 6 is a block diagram of a dual-band WLAN device of a STA that supports RSDB communication over the base-channel with an AP and over the off-channel with peer STAs using TDLS direct links in accordance with one embodiment of the present disclosure.

FIG. 6 is a block diagram of a dual-band WLAN device 600 of a STA that supports RSDB communication over the base-channel with an AP and over the off-channel with peer STAs using TDLS direct links in accordance with one embodiment of the present disclosure. The dual-band WLAN device 600 includes two independent cores that provide concurrent 802.11 operation in both 2.4 GHz and 5 GHz bands. A primary core includes the 802.11 MAC 602 and 802.11 PHY 604 that may operate at the off-channel 5 GHz band at 20, 40, or 80 MHz channels in 2×2 MIMO mode to provide an off-channel TDLS link to transfer data with a dual-band WLAN device of a peer STA. An auxiliary core includes the 802.11 MAC 606 and 802.11 PHY 608 that may operate at the base-channel 2.4 GHz band at 20 MHz channels in 2×2 MIMO mode to provide a base-channel link with an AP to communicate with the AP and to transfer data with legacy STAs that operate in the 2.4 GHz band. The primary core and auxiliary cores may be configured to support two fully simultaneous MIMO channels in RSDB operation.

The dual-band WLAN device 600 includes dual-band RF transceivers or radios 610 and 612. The dual-band RF transceivers 610/612 include filters, power amplifiers, mixers, gain-control function, etc., that modulate and up-convert the baseband signals from the 802.11 PHY to the 2.4 GHz and 5 GHz bands, and filter and down-convert the 2.4 GHz and 5 GHz RF signals to baseband. The transceivers 610/612 may interface with an external RF front end device 614 that provides low-noise amplifiers, power amplifiers, and switches for additional signal conditioning in the 2.4 GHz and 5 GHz bands. The dual-band transceivers 610/612 or external RF front end device 614 may transmit and receive through one or more antennas 618. The dual-band WLAN device 600 may interface to a host processor through a PCI Express bus 616. The WLAN operation may be compatible with the various 802.11x standards, including 802.11z that provides the facility for dual-band capable WLAN devices of peer STAs to establish TDLS direct links with other in the 5 GHz band.

In one embodiment, the dual-band WLAN device 600 may include a memory and a processing device (not shown). The memory may be synchronous dynamic random access memory (DRAM), read-only memory (ROM)), or other types of memory, which may be configured to store the code to perform the function of a WLAN driver. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, to establish a link over the 2.4 GHz base-channel for communicating with an AP and a TDLS direct link over the 5 GHz off-channel for communicating with a peer STA in the RSDB configuration discussed herein.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. For example, the TDLS with RSDB configuration may be extended to support different channels of a frequency band, not just multiple frequency bands. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A dual-band wireless device, comprising:
a memory including instructions;
a processor configured execute the instructions to:
establish a first wireless link with an access point (AP) using a first frequency band;
establish a tunneled direct link setup (TDLS) link with a peer wireless device using the first frequency band;
switch from using the first frequency band for the TDLS link with the peer wireless device to using a second frequency band for the TDLS link with the peer wireless device; and
using a real-time simultaneous dual band (RSDB) configuration to concurrently communicate with the AP through the first wireless link using the first frequency band and with the peer wireless device through the TDLS link using the second frequency band;
a first pair of a media access controller (MAC) module and a physical layer (PHY) core configured to process data to be transmitted or data received using the first frequency band; and
a second pair of a MAC module and a PHY core configured to process data to be transmitted or data received using the second frequency band, wherein the first pair of the MAC module and the PHY core operate concurrently with the second pair of the MAC module and the PHY core during operation of the RSDB configuration.

2. The dual-band wireless device of claim 1, wherein the first frequency band is at 2.4 GHz and the second frequency band is at 5 GHz.

3. The dual-band wireless device of claim 1, wherein to establish the TDLS link with the peer wireless device using the first frequency band, the processor is configured execute the instructions to:
transmit a TDLS setup request frame on the first wireless link to the peer wireless device; and
receive a TDLS setup response frame on the first wireless link from the peer wireless device.

4. The dual-band wireless device of claim 3, wherein the switch is responsive to a determination that the peer wireless device supports the RSDB configuration using the second frequency band, wherein the determination is based on an indication in the TDLS setup response frame of a TDLS capability of the peer wireless device.

5. The dual-band wireless device of claim 1, wherein to switch the TDLS link from the first frequency band to the second frequency band, the processor is configured to execute the instructions to:
transmit a channel switch request frame to the peer wireless device over the TDLS link using the first frequency band to the peer wireless device; and
receive an acknowledgement frame over the TDLS link using the first frequency band from the peer wireless device.

6. The dual-band wireless device of claim 1, wherein the processor is further configured to execute the instructions to toggle between using the first frequency band and using the second frequency band to allow the dual-band wireless device to communicate with the AP through the first wireless link and with the peer wireless device through the TDLS link in a virtual simultaneous dual band (VSDB) configuration.

7. The dual-band wireless device of claim 1, wherein the processor is further configured to execute the instructions to disable the TDLS link on the second frequency band.

8. The dual-band wireless device of claim 1, wherein the processor is further configured to execute the instructions to:
establish a second TDLS link with a second peer wireless device, using the second frequency band; and
use the RSDB configuration to concurrently communicate with the AP using the first frequency band and communicate with the second peer wireless device through the second TDLS link using the second frequency band.

9. The dual-band wireless device of claim 8, wherein the processor is further configured to execute the instructions to arbitrate between channels of the second frequency band to communicate with the peer wireless device over the TDLS link on the second frequency band or with the second peer wireless device over the second TDLS link on the second frequency band.

10. A non-transitory machine-readable medium including instructions that when executed by one or more processors, perform operations comprising:
establishing a first wireless link with an access point (AP) via a first frequency band;
establishing a tunneled direct link setup (TDLS) link with a peer wireless device using the first frequency band;
switching from using the first frequency band for the TDLS link to using a second frequency band for the TDLS link, wherein the switching of the TDLS link from the first frequency band to the second frequency band comprises:
transmitting a channel switch request frame to the peer wireless device over the TDLS link on the first frequency band to the peer wireless device,
receiving an acknowledgement frame over the TDLS link on the first frequency band from the peer wireless device, and
determining that the peer wireless device supports the RSDB configuration on the second frequency band by determining from the TDLS setup response frame, a TDLS capability of the peer wireless device; and
using a real-time simultaneous dual band (RSDB) configuration, communicating with the peer wireless device through the TDLS link using the second frequency band and concurrently communicating with the AP through the first wireless link using the first frequency band.

11. The non-transitory machine-readable medium of claim 10, wherein the first frequency band is at 2.4 GHz and the second frequency band is at 5 GHz.

12. The non-transitory machine-readable medium of claim 10, wherein the switching of the TDLS link from the first frequency band to the second frequency band comprises:
transmitting a channel switch request frame to the peer wireless device over the TDLS link on the first frequency band to the peer wireless device; and
receiving an acknowledgement frame over the TDLS link on the first frequency band from the peer wireless device.

13. The non-transitory machine-readable medium of claim 10, further comprising toggling between using the first frequency band and the second frequency band to communicate with the AP through the first wireless link and with the peer wireless device through the TDLS link in a virtual simultaneous dual band (VSDB) configuration.

14. The non-transitory machine-readable medium of claim 10, further comprising:
   establishing a second TDLS link with a second peer wireless device using the second frequency band; and
   using the RSDB configuration, communicating with the second peer wireless device through the second TDLS link using the second frequency band while communicating with the AP through the first wireless link using the first frequency band.

15. The non-transitory machine-readable medium of claim 14, further comprising arbitrating between channels of the second frequency band to communicate with the peer wireless device over the TDLS link on the second frequency band or with the second peer wireless device over the second TDLS link on the second frequency band.

16. A system comprising:
   a plurality of antennas;
   a dual-band communication device configured to couple to the antennas to cause the plurality of antennas to transmit or receive over a plurality of frequency bands, the dual-band communication device comprising:
      a first pair of a media access controller (MAC) module and a physical layer (PHY) core configured to process data to be transmitted or data received using a first frequency band; and
      a second pair of a MAC module and a PHY core configured to process data to be transmitted or data received using a second frequency band, wherein the first pair of the MAC module and the PHY core operate concurrently with the second pair of the MAC module and the PHY core during operation of the RSDB configuration; and
   a processing device configured to:
      establish, through the dual-band communication device and the plurality of antennas, a first wireless link on the first frequency band to a first wireless device;
      establish, through the dual-band communication device and the plurality of antennas, a tunneled direct link setup (TDLS) link on the first frequency band to a second wireless device;
      switch from using the first frequency band for the TDLS link with the second wireless device to using a second frequency band for the TDLS link with the second wireless device; and
      use a real-time simultaneous dual band (RSDB) configuration to communicate with the second wireless device through the TDLS link using the second frequency band and in parallel communicate with the first wireless device through the first wireless link using the first frequency band.

17. The system of claim 16, wherein the switch is responsive to a determination that the second wireless device supports the RSDB configuration using the second frequency band.

* * * * *